US012567786B2

(12) United States Patent
Price et al.

(10) Patent No.: US 12,567,786 B2
(45) Date of Patent: Mar. 3, 2026

(54) DC MOTOR AND INTERPOLE COIL REPLACEMENT METHOD

(71) Applicant: Timken Gears & Services Inc., King of Prussia, PA (US)

(72) Inventors: Buddy L. Price, Bluefield, VA (US); Jan Hendrik de Swardt, Eustis, FL (US)

(73) Assignee: Timken Gears & Services Inc., King of Prussia, PA (US)

( * ) Notice: Subject to any disclaimer, the term of this patent is extended or adjusted under 35 U.S.C. 154(b) by 309 days.

(21) Appl. No.: 18/295,664

(22) Filed: Apr. 4, 2023

(65) Prior Publication Data

US 2024/0171050 A1     May 23, 2024

Related U.S. Application Data

(60) Provisional application No. 63/384,665, filed on Nov. 22, 2022.

(51) Int. Cl.
*H02K 15/50* (2025.01)
*H02K 3/12* (2006.01)
*H02K 15/062* (2025.01)

(52) U.S. Cl.
CPC .............. *H02K 15/50* (2025.01); *H02K 3/12* (2013.01); *H02K 15/062* (2013.01)

(58) Field of Classification Search
CPC ........ H02K 15/062; H02K 15/50; H02K 3/12; H02K 3/18
See application file for complete search history.

(56) References Cited

U.S. PATENT DOCUMENTS

| | | | | | |
|---|---|---|---|---|---|
| 5,723,928 | A | * | 3/1998 | Imai ....................... | H02K 16/04 |
| | | | | | 310/209 |
| 7,342,331 | B2 | * | 3/2008 | Down ...................... | H02K 7/04 |
| | | | | | 310/214 |
| 10,008,912 | B2 | * | 6/2018 | Davey .................... | H02K 21/12 |

(Continued)

FOREIGN PATENT DOCUMENTS

| | | | | | |
|---|---|---|---|---|---|
| EP | | 1619778 | A1 * | 1/2006 | ............... H02K 7/04 |
| WO | WO-2012080060 | A2 * | 6/2012 | ............. H02K 23/26 |

OTHER PUBLICATIONS

Translation of EP-1619778-A1 (Year: 2006).*
Translation of WO-2012080060-A2 (Year: 2012).*

*Primary Examiner* — Jeffrey T Carley
(74) *Attorney, Agent, or Firm* — Michael Best & Friedrich LLP

(57) ABSTRACT

A method of replacing a failed interpole coil on a DC motor field frame having integral interpole coil cores. The failed interpole coil is removed from the interpole coil core of the field frame. A new interpole coil, separate from the corresponding interpole coil core, is wound to replace the failed interpole coil, the new interpole coil including conductor turns and insulation. A retainer is mounted to the field frame at an axial end thereof, the retainer having a body portion extending radially inward with a width configured to fit within an interior dimension of the new interpole coil. The retainer has a stand-off projecting from the body. The new interpole coil is assembled in a radial direction onto the corresponding interpole coil core such that the new interpole coil is positioned by the stand-off. The insulation of the new interpole coil is resin coated and cured.

10 Claims, 7 Drawing Sheets

(56)  References Cited

U.S. PATENT DOCUMENTS

| 10,855,131 B2 * | 12/2020 | Coldwate | ............... H02K 3/325 |
| 11,489,396 B2 * | 11/2022 | Marjomaa | .............. H02K 3/522 |
| 2003/0184180 A1 * | 10/2003 | Doherty | ................ H02K 3/527 |
| | | | 310/214 |
| 2010/0289371 A1 * | 11/2010 | Pfleger | ................ H02K 21/044 |
| | | | 310/263 |

* cited by examiner

20

DC MOTOR AND INTERPOLE COIL REPLACEMENT METHOD

CROSS-REFERENCE TO RELATED APPLICATIONS

The present application claims the benefit of priority to U.S. Provisional Patent Application No. 63/384,665, filed on Nov. 22, 2022, the entire contents of which are incorporated by reference herein.

BACKGROUND

The present application relates to the refurbishment or rebuild of DC electric machines (motors and/or generators). Some DC machines are built with interpole coil cores that are separable from the field frame unit. Separable interpole cores, manufactured from steel plates or laminations or solid, can receive the conductor turns forming the interpole winding in a separate process off the field frame. Interpole windings can then be assembled, for example bolted or wedged, to the field frame prior to finishing such as treatment with insulating varnish or resin in a vacuum pressure impregnation or trickle process. Sometimes that insulating material is painted with, or soaked in insulating varnish or resin, which results in what is referred to as a "wet winding process."

When the cores are separately formed, a rebuild can be accomplished by winding a new coil (interpole coil) on the removed core and then re-assembling the coil/core combination to the field frame. However, in some other DC machine constructions, the interpole coil cores are all integrally formed with the field frame and the field coil cores. When the cores are all integral, the rebuild options are limited or non-existent. The DC machine must either be returned to the original equipment manufacturer (for an entire re-winding of all the coils together), or the machine is simply considered unrepairable (e.g., the time and cost would be near or exceeding a newly manufactured machine).

SUMMARY

In one aspect, the disclosure provides a method of replacing a failed interpole coil on a DC motor field frame having a plurality of integral interpole coil cores. The failed interpole coil is removed from a corresponding one of the plurality of integral interpole coil cores of the field frame. A new interpole coil, separate from the corresponding interpole coil core, is wound to replace the failed interpole coil, the new interpole coil including conductor turns and insulation. A retainer is mounted to the field frame at an axial end thereof, the retainer having a body portion extending radially inward with a width configured to fit within an interior dimension of the new interpole coil. The retainer has a stand-off projecting from the body. The new interpole coil is assembled in a radial direction onto the corresponding interpole coil core such that the new interpole coil is positioned by the stand-off. The insulation of the new interpole coil is resin coated and cured.

In another aspect, the disclosure provides a DC motor including a field frame having a plurality of integral interpole coil cores. An interpole coil includes conductor turns and insulation. A retainer is mounted to the field frame at an axial end thereof, the retainer having a body portion extending radially inward and received by an interior dimension of the interpole coil. The retainer has a stand-off projecting from the body. The interpole coil is positioned in a radial direction by the stand-off, and the interpole coil is secured to the stand-off.

DETAILED DESCRIPTION

Figure 1:
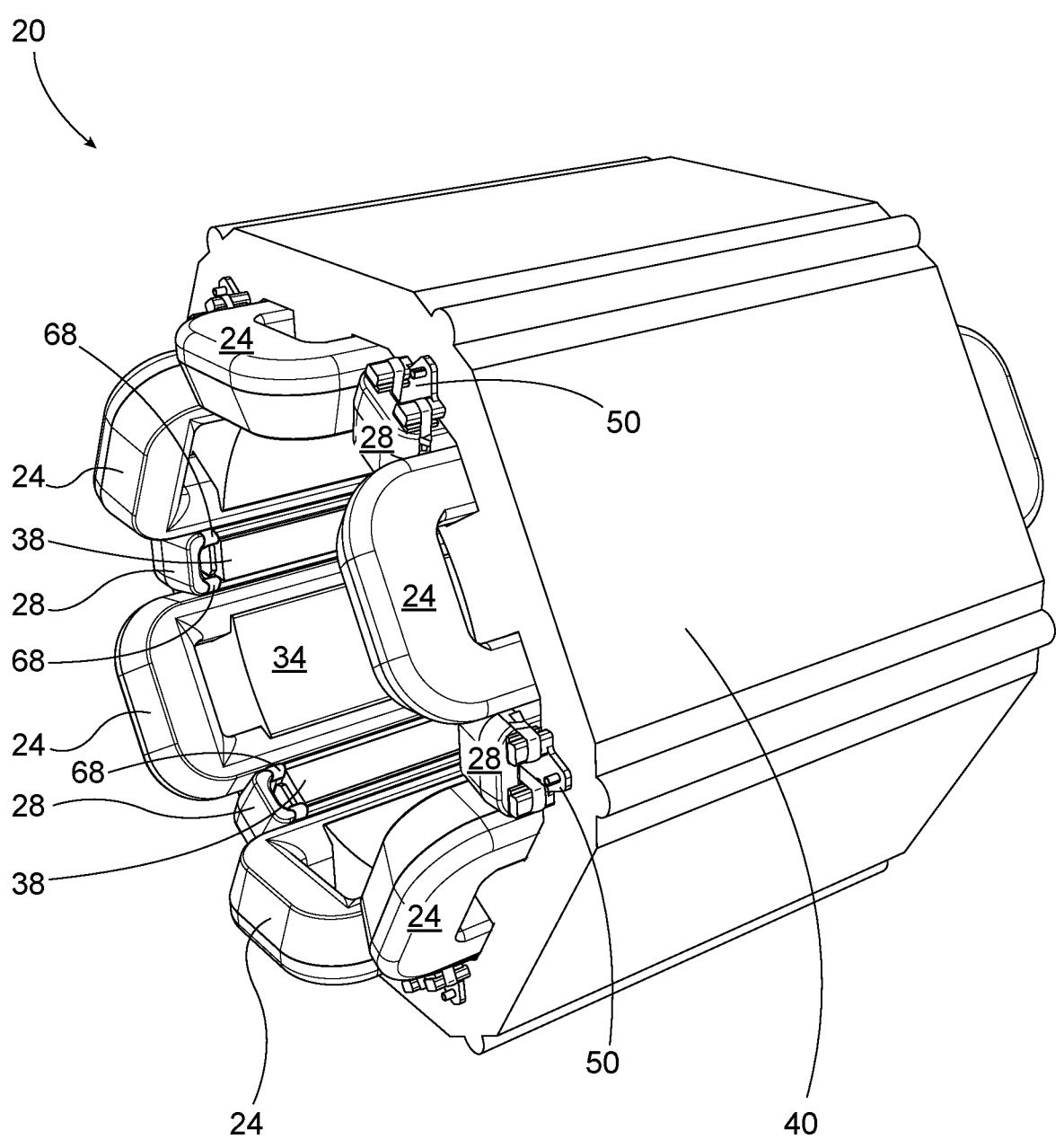
FIG. 1 is a perspective view of a DC electric machine stator rebuilt according to aspects of the present disclosure.
Figure 2:
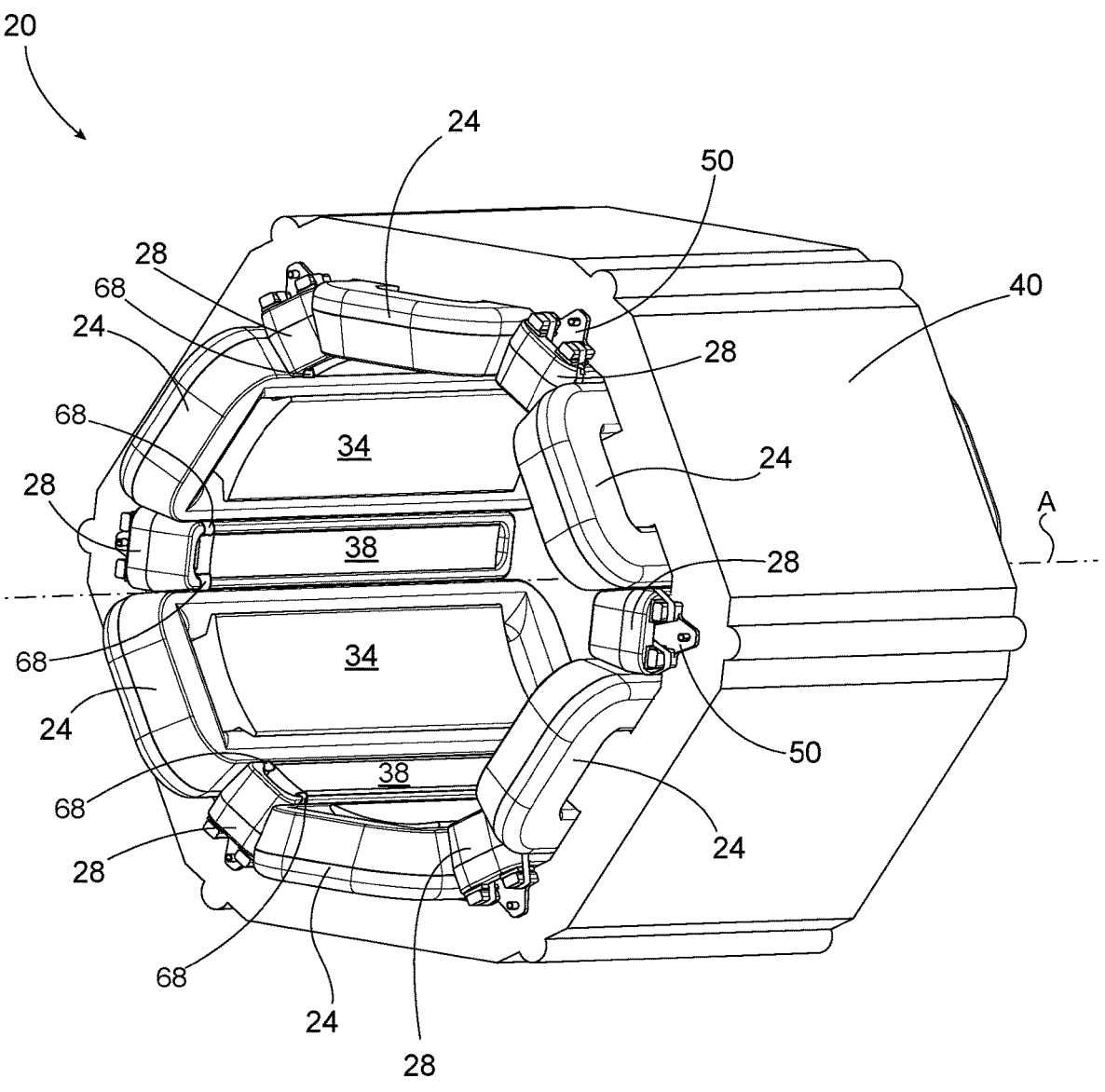
FIG. 2 is a perspective view of an opposite end of the rebuilt DC electric machine of FIG. 1.
Figure 3:
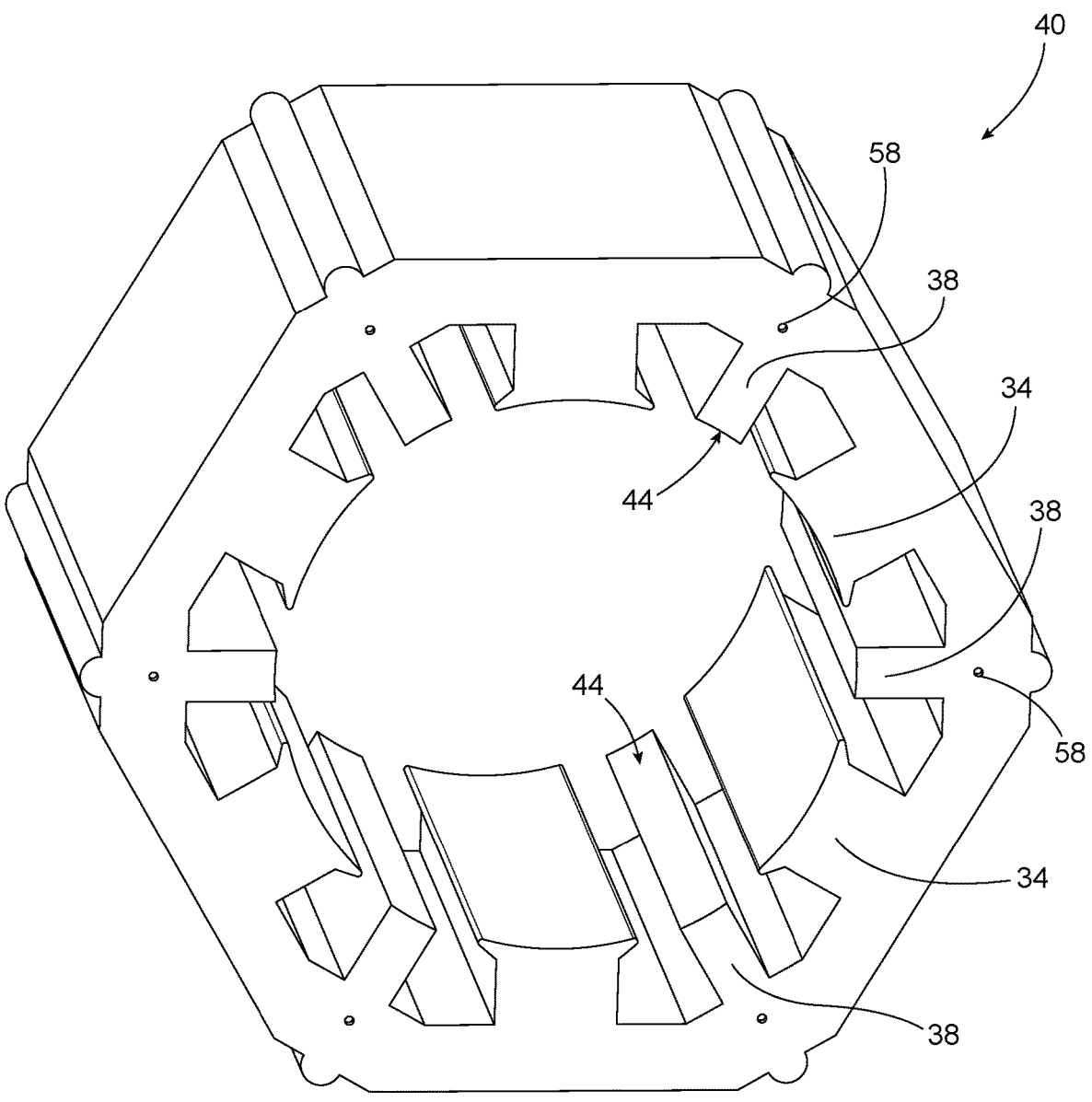
FIG. 3 is a perspective view of the field frame of the DC electric machine of FIGS. 1 and 2.
Figure 4:
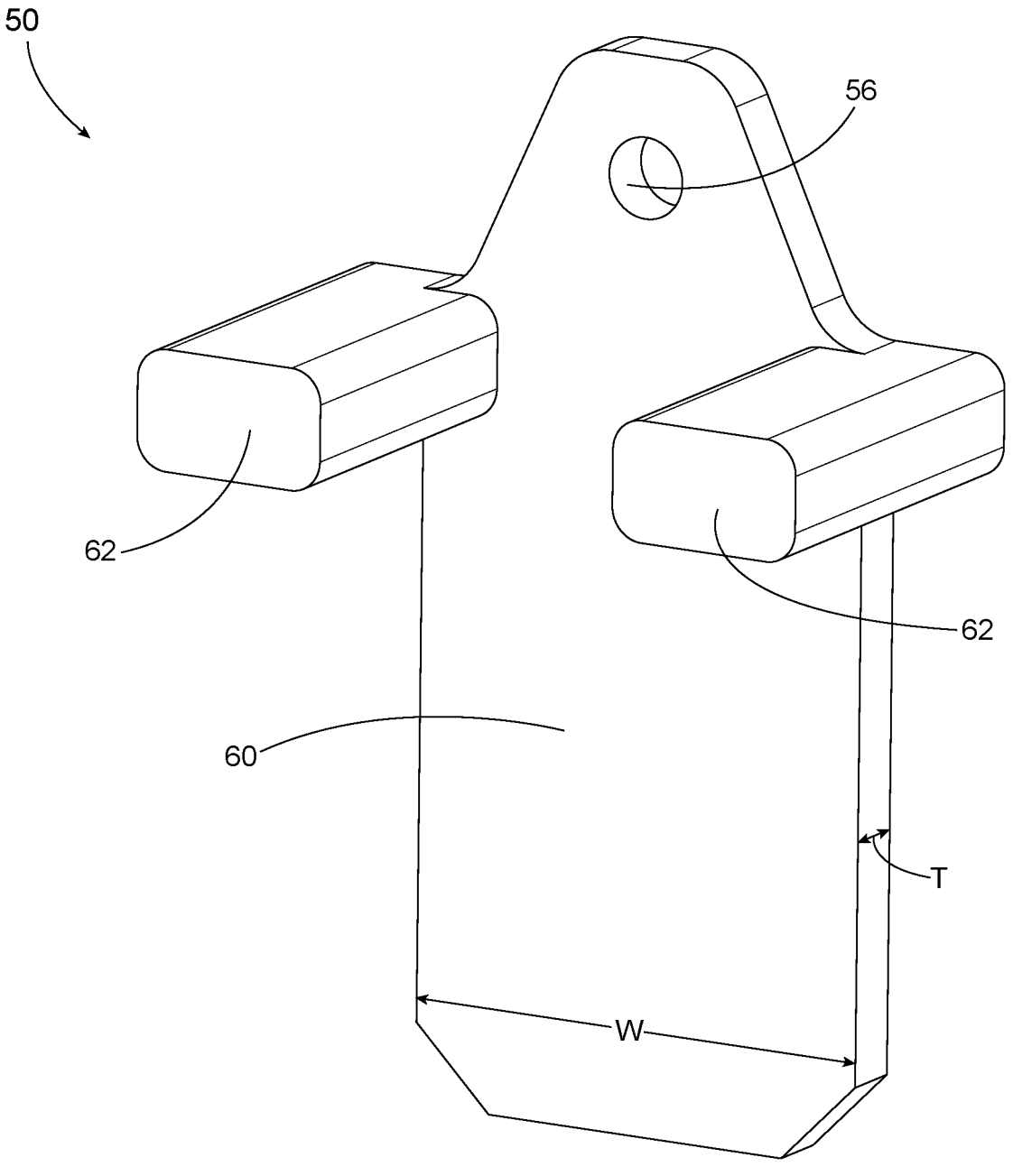
FIG. 4 is a perspective view of an interpole retainer according to one construction of the present disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-6 illustrate a DC electric machine 20 according to one embodiment of the present disclosure. While the DC machine 20 can be operable as a motor and/or generator depending upon a particular industrial application or installation, the DC machine 20 may be referred to simply as the DC motor 20 herein, without limiting effect. In other words, for the context of the present disclosure (which does not relate to the operation of the DC machine and whether mechanical energy is output or input), the term DC motor 20 applies to a DC machine configured for operation as a motor and/or generator. Although the present disclosure may be applicable to a variety of DC motors 20, one particular type of DC motor that has found benefit from the aspects of the present disclosure is rated at 800 hp output at 500 Volts. Full load current is 1248 A and full load speed is 1750 rpm. The motor can be found in steel mill applications. As will be appreciated from the following description, the DC motor 20 can be of conventional construction prior to a refurbishment or rebuild carried out in accordance with the present disclosure. The DC motor 20 has an armature (not shown) with a shaft along a central rotation axis A, and the armature is received within the hollow stator shown in FIGS. 1 and 2. The stator includes a plurality of (e.g., six in this specific example) main poles with main field windings or coils 24 and, circumferentially interspersed between them, a plurality of interpole windings or coils 28. As used herein, the terms coil and winding are synonymous, and both refer to conductors wound along a plurality of turns into loops. All the field windings 24 and the interpole windings 28 have corresponding cores 34, 38 about which the conductor turns are wrapped. The field winding cores 34 and the interpole winding cores 38 are formed integrally together as part of a unitary yoke or frame 40 shown in isolation in FIG. 3. As will be appreciated by those of skill in the art, interpole windings 28 are narrow windings between the main field windings 24 that offset the armature reaction in the DC Machine 20 so as to avoid distortion of the main field flux.

The interpole cores 38 do not facilitate self-retention of the interpole windings 28 to enable separate manufacture of an interpole unit for assembly to the field frame 40. In particular, the interpole core 38 is not a separate and securable part (that can be bolted in or wedged in place on the field frame 40), but an integral part of the field frame 40. Here the term integral need not necessarily require mono-lithic construction, but at least joining by permanent means that cannot be disassembled in a non-destructive manner. For example, the field frame 40 can be constructed of steel plates welded together such that destructive means would be required to separate the interpole core 38 from the field frame 40. It is also noted that the radially interior sides 44 of the interpole cores 38 do not have an enlarged width section or "lip" (as the cores 34 for the field windings 24 do) for mechanically securing the radial position of the interpole windings 38, particularly during assembly prior to encase-ment in resin (e.g., with vacuum pressure impregnation "VPI" process), but also during normal operation of the finished machine 20. Rather, the interpole cores 38 have a simple rectangular section in which the width remains constant in a direction toward the central axis A. Because of the above identified construction of the interpole cores 38, a single interpole winding failure would conventionally lead to the entire set of interpole windings 28 and the field windings 24 having to be replaced at the same time, accord-ing to the design and process of the original manufacturer, utilizing specialized and proprietary tooling and jigs (not shown) which are designed for and limited to creating the entire set of field and interpole windings 24, 28. Prior to the present invention, this leads to the DC machine 20 being scrapped as "unrepairable" even for a single interpole wind-ing failure, in the event that the original equipment manu-facturer is unwilling to accept customer requests for rebuild-ing. In some cases, it may also be simply cost prohibitive, as the cost to rebuild the entire set of field and interpole windings 24, 28 can rival or exceed the cost of a new machine.

In order to facilitate replacement of an interpole winding 28 on a pre-existing stator of the DC machine 20 (e.g., having the field windings 24 installed), a retention block, or interpole retainer 50, is fitted to the field frame 40 at the circumferential location of the interpole coil 28. The retainer 50 can be secured to the axial end of the field frame 40 by a fastener 54. The fastening location can be radially outside of the maximum diameter of the central opening in the field frame 40. Although alternate fastening means may be used for mounting the retainer 50, the illustrated construction utilizes a pin such as a dowel, roll pin, or spring dowel. The pin 54 cooperatively fits into a hole 56 of the retainer 50 and a hole 58 (FIG. 3) formed in the frame 40 (e.g., a blind hole in the axial end surface of the frame 40). As part of the rebuilding or refurbishing method of a failed DC machine 20, the hole 58 may need to be drilled into the frame 40 at the prescribed location, and the retainer 50 provided as a newly added component (not part of the original failed DC machine 20). Although the pin 54 is one example of a mechanical fastener, the retainer 50 may be mounted with one or more alternate mechanical fasteners, including threaded fasteners 54A (e.g., a bolt, a screw, etc.) as shown in FIG. 5A. In addition or in lieu of mechanical fasteners, the retainer 50 may be mounted by bonding (e.g., with a curable adhesive). The retainer 50 may be welded in place if constructed of metal. As shown by the opposite ends of the DC machine 20 in FIGS. 1 and 2, the same process steps may be carried out on both ends such that there is a retainer 50 at each end of the frame 40 for each one of the interpole coils 28 being replaced.

The retainer 50 is used to secure the interpole coil 28 in the correct location while the interpole coil 28 is fitted onto the interpole coil core 38. The width W of the retainer 50 is selected to ensure center-fitment of the interpole coil 28 onto the interpole core 38. In other words, the retainer width 50 can correspond to an interior width of the interpole coil 28 such that there is little to no clearance. The thickness T of the retainer 50 is selected for sufficient mechanical strength to retain the interpole coil 28 onto the interpole core 38 during the winding and impregnation process. In some construc-tions, the thickness T of the retainer 50 is 2 mm or more to ensure machinability. The retainer 50 can, at least within a body portion 60 thereof, have a sheet or plate construction in some embodiments, including that illustrated where the width W exceeds the thickness T by a large margin (e.g., forming a ratio in excess of 5:1). However, the retainer 50 may take alternate forms in other constructions. The retainer 50 has one or more (e.g., two) stand-offs 62 that project outwardly from the body portion 60. The illustrated con-struction of the retainer 50 has two stand-offs 62 that are spaced apart by a width matching that of the interpole coil 28. The stand-offs 62 are parallel to each other. The stand-offs 62 projection orthogonally from the body portion 60. The stand-offs 62 are used to retain and support the interpole coil 28 in the radial direction. In particular, the stand-offs 62 limit the radial outward extent to which the corresponding interpole coil 28 can be positioned. When the retainer 50 is mounted, the stand-offs 62 can be radially at or outside of the maximum diameter of the central opening in the field frame 40. The retainer 50 can be machined from an epoxy impreg-nated laminated glass board, (e.g., G11 glass-composite, but alternately G10, G3, etc. available from Boedeker Plastics, Inc.), with the material grade selected based on the tem-perature requirements and mechanical strength require-ments. The retainer 50 can alternatively be made from other mechanically strong insulation material using other manu-facturing methods.

Figure 6:
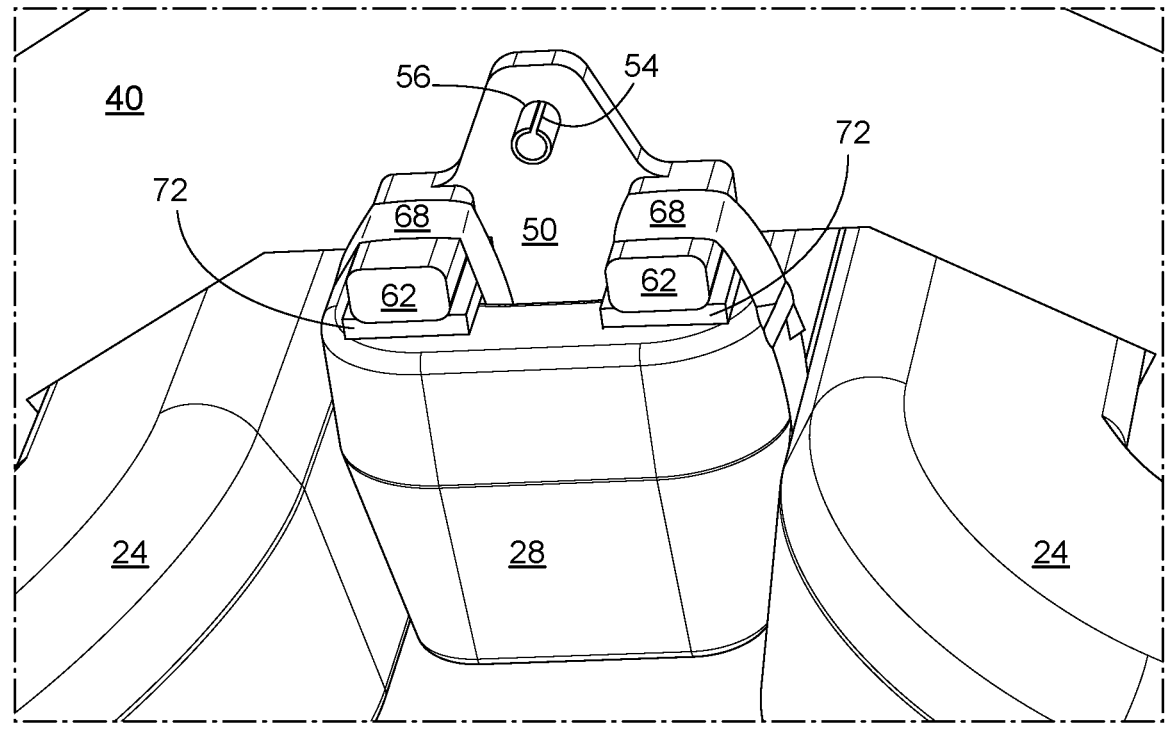
FIG. 6 is a perspective view of the rebuilt interpole winding secured in position with respect to the field frame by lashing to the retainer.

The retainer 50, and particularly the stand-offs 62, provide a structure to which the interpole coil 28 can be secured (e.g., lashed or tied). In some constructions, lashing 68 in the form of a woven glass and/or polyester tape is used to lash or tie the interpole coil 28 to the retainer 50. FIG. 6 illustrates the lashing 68 wrapped and tied around the interpole coil 28 and the stand-offs 62. Radially between the interpole coil 28 and the retainer 50, one or more spacers 72 are inserted. The spacers 72 can be glass fiber or felt, polyester fiber or felt, and/or polyester and glass fiber or felt strips. The spacers 72 are fitted to ensure spacing and secure positioning of the interpole coil 28 while remaining soft and non-damaging to the interpole coil insulation, which is also porous. The spacers 72 act as shims and occupy an amount of space left between the stand-offs 62 and the adjacent radially outer portion of the interpole coil 28 to obtain proper positioning of the interpole coil 28 on the frame 40. In other words, the retainer 50 is intentionally undersized from the mounting hole 56 to the radially inner side of the stand-offs 62, and this avoids costly precision manufacturing and assembly techniques as it relates to the retainer 50.

Figure 5:
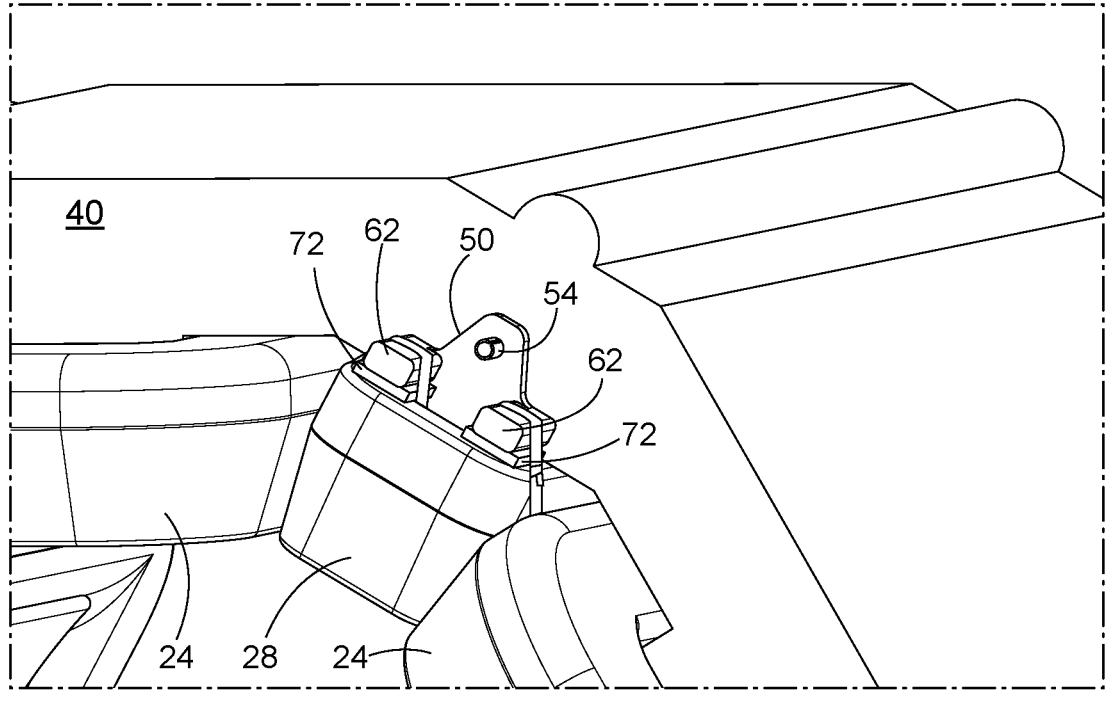
FIG. 5 is a detail perspective view of the rebuilt DC electric machine of FIGS. 1 and 2, showing a rebuilt interpole winding positioned against the retainer of FIG. 4.
Figure 5A:
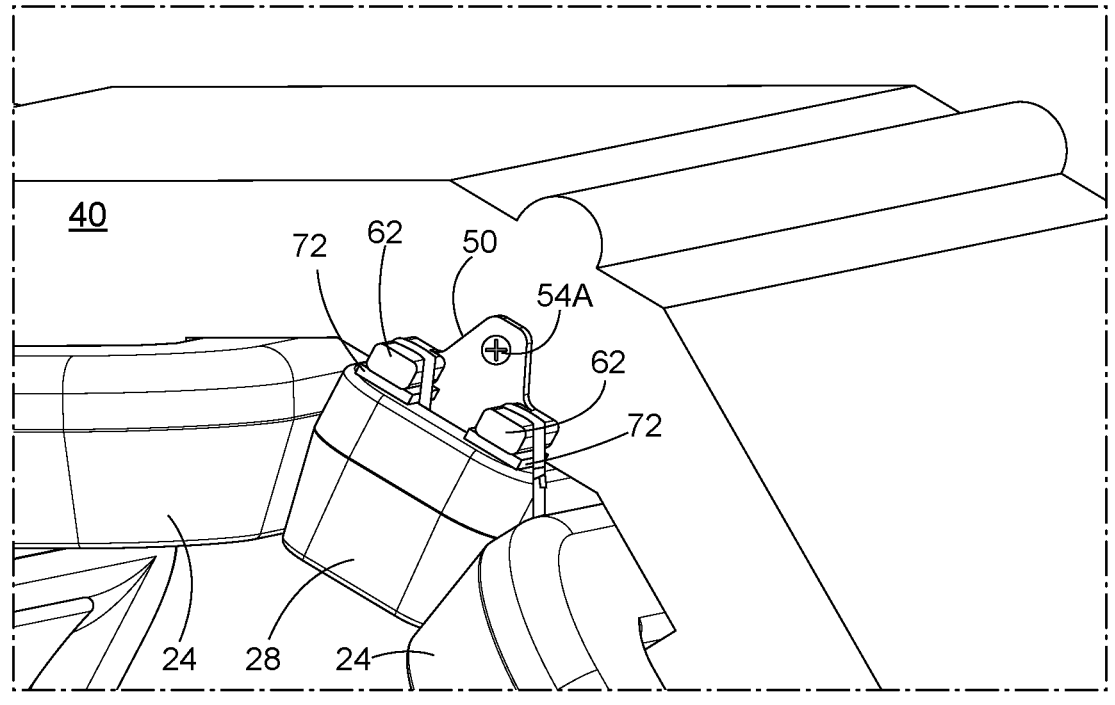
FIG. 5A is a detail perspective view similar to FIG. 5, with the exception of an alternate fastener securing the retainer to the field frame.

For assembly of a given interpole coil 28, the frame 40 can be rotated to an orientation in which the corresponding interpole core 38 to receive the interpole coil 28 is located at the bottom, toward the ground (generally opposite of the orientation shown in FIGS. 5 and 6). Thus, the interpole coil 28 being installed can be at least partially retained in proper position by gravity—particularly prior to and/or during the application of the lashing 68. The frame 40 can be rotated one or more times for reorientation during the rebuilding process as interpole coils 28 are assembled, prior to final resin treatment and curing.

The necessary clearances between the interpole coil cores 38 and interpole coils 28 are filled with insulation material, which is typically layers of polyimide mica paper reinforced with glass cloth; layers of mica paper reinforced with glass cloth; layers of mica tape backed with aramid and reinforced with glass cloth; glass fiber or felt, polyester fiber or felt; and/or Polyester+Glass fiber or felt. These insulation materials are specifically selected because of their high electrical insulation properties and porosity. The fully wound stator, including the field frame 40 and new interpole winding(s) 28, is then treated with resin (polyester, epoxy, silicone), with a vacuum pressure impregnation process in order to ensure removal of all air and complete saturation of the porous insulation. The resin can be of a thixotropic type, ensuring thick coating and bond—filling all spaces between the interpole coils 28 and interpole core 38.

Once treated with resin, the motor 20 is cured in a temperature-controlled oven to form high electrical strength and good mechanical strength and bonding between the interpole coils 28 and interpole cores 38. From this point on, the retainers 50 serve no purpose since the interpole coils 28 are fully secured and cannot move. The retainers 50 are however also secured in place by the resin, and since they have no negative influence on the performance of the motor, they are left in place.

The equipment and methodology described above make it possible to repair the winding(s) of the DC motor 20, reduces the time to wind the motor and even makes it possible to only repair a single coil or a few coils. Overall, this transforms the motor 20 and renders it repairable (via rewinding of all interpoles or even single interpoles) and saves customers significant time and money.

What is claimed is:

1. A method of replacing a failed interpole coil on a DC motor field frame having a plurality of integral interpole coil cores, the method comprising:

removing the failed interpole coil from a corresponding one of the plurality of integral interpole coil cores of the field frame;

winding a new interpole coil, separate from the corresponding interpole coil core, to replace the failed interpole coil, the new interpole coil including conductor turns and insulation;

mounting a retainer to the field frame at an axial end thereof, the retainer having a body portion extending radially inward with a width configured to fit within an interior dimension of the new interpole coil, and the retainer further having a stand-off projecting from the body;

assembling the new interpole coil in a radial direction onto the corresponding interpole coil core such that the new interpole coil is positioned by the stand-off; and resin coating and curing the insulation of the new interpole coil.

2. The method of claim 1, wherein the retainer is mounted to the field frame by a pin.

3. The method of claim 1, further comprising drilling a hole into an axial end of the field frame after the DC motor has failed and been taken out of service, the drilled hole receiving a fastener that is inserted through the retainer to mount the retainer to the field frame.

4. The method of claim 1, wherein the new interpole coil is assembled by wrapping and tying lashing around the new interpole coil and the stand-off.

5. The method of claim 4, wherein the stand-off is a first stand-off and the retainer further comprises a second stand-off, the method comprising wrapping and tying the lashing around the new interpole coil and both the first and second stand-offs.

6. The method of claim 4, further comprising positioning a spacer between the retainer stand-off and the new interpole coil such that a dimension of the spacer, in combination with the mounted position of the stand-off, sets the radial position of the new interpole coil with respect to the field frame.

7. The method of claim 1, wherein the field frame is rotated to an orientation that enables the new interpole coil to be supported by the stand-off of the retainer against gravity during a step of securing the new interpole coil to the stand-off.

8. The method of claim 7, further comprising further rotating the field frame to another orientation for assembling an additional new interpole coil on the field frame via an additional retainer.

9. The method of claim 1, wherein the retainer is mounted to the field frame by a threaded fastener.

10. The method of claim 1, further comprising:

mounting an additional retainer to the field frame at an opposite axial end thereof, the additional retainer having a body portion extending radially inward with a width configured to fit within the interior dimension of the new interpole coil, and the additional retainer further having a stand-off projecting from the body thereof; and assembling the new interpole coil in a radial direction onto the corresponding interpole coil core such that a portion of the new interpole coil at the opposite axial end is positioned by the stand-off of the additional retainer.

\*    \*    \*    \*    \*